Patented Feb. 26, 1935

1,992,570

UNITED STATES PATENT OFFICE 1,992,570

VARNISH AND RESIN THEREFOR

Henry A. Gardner, Washington, D. C.

No Drawing. Application February 15, 1934,
Serial No. 711,441

6 Claims. (Cl. 134—26)

This invention relates to the art of making varnishes, and is concerned more particularly with an improvement in the production of varnishes whose resin content consists essentially of synthetic resins and whose oily vehicle includes a varnish oil of the nature of tung oil or China-wood oil.

According to older varnish-making technic, natural gums such as kauri and copal were heated to make them soluble in linseed oil: otherwise, they would not dissolve in the oil. The heating was usually conducted at temperatures up to 570° F. for a period such that there would result a fume loss of up to 25% of the weight of the resin. These natural resins withstand such heating without becoming solidified. Linseed oil was then added, and further cooking resorted to, before thinning with turpentine. Varnishes produced in this fashion were invariably slow drying, usually requiring at least 24 hours to produce a hard surface. Moreover, they were not fully water resistant, nor were they of good durability. More recently, synthetic resins have been used to some extent as part or all of the resin contents of varnishes, these resins possessing certain desirable characteristics as varnish resins not possessed by the aforesaid naturally occurring starting materials. In preparing varnishes therefrom, it has been proposed to melt the synthetic resins directly in the oils, there usually being employed therefor a mixture of tung oil and linseed oil. These condensed synthetic resins usually are made by condensing phenolic bodies with formaldehyde substances, by condensing phthalic or maleic acids with glycerin, or by similar means. The thermo-setting synthetic condensed resins cannot be heated to very great temperatures, because of their heat-convertible properties, without being converted into insoluble solid masses. For instance, when a phenol-formaldehyde resin is heated in the presence of tung oil to a temperature much above 450° F., partial solidification occurs, insoluble complexes being formed which cannot be dissolved in or thinned with turpentine or other diluents. It is for this reason that at the present time varnishes containing the above named resins are not cooked above 450° F. This, of course, constitutes a great disadvantage, inasmuch as the resulting varnishes have a low viscosity which requires that the varnish contain up to about 60% of non-volatile matter in order to be of good body, whereas ordinary varnishes which can be cooked at high temperatures usually contain only about 45% of non-volatile matter. All of this is due to the fact that the tung oil in a varnish which has been cooked only to about 450° F. is really undercooked and does not have a good body or viscosity. Tung oil should preferably be cooked up to 580° F. to produce a proper body. Moreover, such varnishes as are referred to above, which are produced by cooking synthetic condensed resins with tung oil at approximately 450° F., often form "frosted" (i. e., wrinkled or checked) surfaces during the drying period.

An object of the present invention is the provision of a varnish or liquid coating composition of which the resin content consists essentially of a synthetic resin and of which the oily vehicle includes a drying and/or semi-drying oil of the type of tung oil, which varnish shall possess good body even though containing not more than about 45% of non-volatile matter. Another object of the present invention is the provision of a varnish composition of the aforesaid general constitution which varnish composition yields a film which does not develop frostiness, checking, or wrinkles, during the drying period or thereafter. Other objects of the invention include a means for, and method of, protecting the synthetic resin content of the varnish against premature or undesired conversion into insolubility during the high temperature treatment incident to varnish-making.

The above, and other, objects of invention are attained by employing in the cook a relatively very small but effective amount of an agent adapted to prevent solidification of the synthetic resin to an insoluble mass when heated with varnish oil at a temperature above 450° F., or by providing for the cook a thermo-setting synthetic resin which has been pre-treated with such an agent.

I have found by experimentation that practically every known synthetic resin used in modern varnish making may be so modified by the agent that it may be cooked in the presence of tung oil or other oils at temperatures even up to 600° F. without becoming converted by the heat into insoluble masses. The cooking of these synthetic resins with the tung oil and/or other varnish oil at these high temperatures, in the presence of a small amount of a depolymerizing agent of the group consisting of sulphur and sulphur-containing organic compounds capable of darkening white lead when heated with the latter, allows the production of varnishes of excellent body, even though they be thinned with a very large content of thinner and contain only about 45% of non-volatile matter in the finished form.

This novel result may be effected through the introduction into the resin of what amounts to practically minute quantities of sulphur or, preferably, sulphur-bearing organic compounds. While the sulphur may be added in the native form, I prefer to add it in an organic form, and for this purpose I have found it most convenient to use a compound prepared by dissolving sulphur in, and then reacting it with, an organic substance. One such substance is chlorinated diphenyl, but other sulphur-containing organic compounds, such as turpentine- or rosin-reaction products with sulphur. Mercapto-benzo-thiazole, and the like, are equally operable. A sulphur-containing organic compound is operable in the present relation if it is capable of darkening white lead when heated with the latter: Such white lead-darkening sulphur-containing organic compounds are adapted for use in carrying out the concepts of the present invention.

The invention will be described in greater detail in the following illustrative examples, it being noted that the invention is not limited to use of the particular sulphur compound there mentioned:

Example I

Into 100 parts by weight of chlorinated diphenyl are mixed 10 or more parts by weight of flowers of sulphur, and the ingredients of the mixture are caused to react by heating at a temperature of about 200° C., the reaction preferably being continued until a clear liquid results, which liquid, upon cooling, hardens to a pulverizable solid. Thereupon the reaction product is allowed to cool, and then is broken up into conveniently small sized pieces.

More than 10% of sulphur with respect to the organic base, e. g., 20% to 25% or more of sulphur, may be employed.

Another very desirable agent may be prepared as follows:

100 parts by weight of turpentine and 10 parts by weight of sulphur (flowers of sulphur) are heated at slightly below the boiling point of the turpentine. After the sulphur has been reacted with the turpentine and has become dissolved therein the mass is cooled to about 150° C. and then from 100 to 200 parts by weight of ordinary rosin are incorporated therein. The resulting mass is allowed to cool to a solid. This sulphur-turpentine-rosin complex may be used in place of sulphurized chlorinated diphenyl or of the other specifically mentioned agents in the following examples:

Example II 100 grams of a heat-convertible phenol-formaldehyde resin (such, for instance, as the product known and sold as "Bakelite XR254," or as "R & H—St—137"), in the resole stage, at which the material is fusible, which material is well known in the varnish trade as being a resin which is heat-convertible when heated in tung oil (or its equivalent) to a temperature above 450° F., is melted in a suitable container, and to the molten material there is added about 0.09 gram of elemental sulphur, or preferably an equivalent amount of the sulphurized chlorinated diphenyl above described. The resulting mass then either is allowed to cool (for preparation for sale as such or for storage for eventual use) or directly is processed to the production of varnish.

When using the above resinous product in the making of varnish the following procedure preferably is followed:

Example III 100 parts by weight of the sulphur-modified synthetic resin referred to in Example II is melted in a kettle with 180 parts by weight of China-wood oil and 20 parts by weight of linseed oil or other semi-drying or drying oil. The mass may be brought to a temperature of 600° F. without danger of polymerization or solidification. Excellent body is obtained by treatment at this high temperature, and no further cooking is necessary. The temperature of the heated mass thereafter is dropped to about 200° F., when it is thinned with at least an equal quantity by weight of turpentine, mineral spirits or other desired thinner, yielding an excellent varnish. Liquid drier, such as cobalt and manganese resinates, linoleates, or naphthenates dissolved in turpentine, may be added in small quantity to effect the usual acceleration of drying.

Example IV 100 parts by weight of a synthetic resin known in the trade as a maleic glyceride-rosin glyceride resin is melted in a kettle with 200 parts by weight of China-wood oil, there being added at the start sufficient of the resinous material shown under Example I, consisting of chlorinated diphenyl and sulphur, or turpentine, rosin and sulphur, to have present in the varnish .05 percent of sulphur based on the oil content. The mass is quickly heated to 300° C. It is then allowed to cool and thinned with an equal quantity of turpentine, mineral spirits or other thinner. Cobalt and manganese, in the form of linoleates, resinates or naphthenates, are added. I usually add sufficient drier so that the oil content of the varnish will have .5% metallic lead and .05% metallic cobalt.

The so-prepared varnish is absolutely gas-proof, whereas heretofore it has never been possible to produce a gas-proof varnish with the aforesaid resin and straight tung oil without any other oil.

A further illustration of the invention is afforded by the following:

Example V 50 grams of a reaction product of glycerin, phthalic anhydride, and fatty acids, is placed in a kettle. 50 grams of a maleic acid-glycerine resin is added. The materials are melted and then treated with .05 gram of sulphur or, preferably, an equivalent percentage of an organic sulphur base. 150 grams of tung oil is then added and the mass is quickly raised to a temperature of 580° F. It is then immediately cooled and thinned with 200 grams of solvent naphtha and 100 grams of turpentine or such other diluents as may be desired, yielding a varnish of good body and other desirable properties.

The maleic acid-glycerin resin may be omitted or may be substituted by another synthetic resin.

It will be appreciated from the foregoing general description and illustrative examples, that application of the concept of the present invention to the production of varnishes from synthetic resin works a rather revolutionary improvement therein, in that it does away entirely with all danger of loss of batches of varnishes, such as occur in varnish factories at the present time when these synthetic condensed resins and tung oil are inadvertently heated to temperatures above 450° F. By this process heat-reactive resins and tung oil may be cooked usually in one-sixth the time of varnishes produced with the same resins but without the special treatment which is the crux of the present invention, thereby working an economy in fuel, and an increased throughput, which are important factors in the technical production of varnishes. Moreover, the varnishes produced by the improved process have novel characteristics including those enumerated in the following:

(1) They do not "frost" to form gas checks when applied and dried in rooms containing foul air. This is a defect that is common with varnishes produced from synthetic condensed resins and tung oil cooked at low temperatures.

(2) The varnishes of the present invention have a distinct advantage in that they give off, during drying, odors very much less disagreeable than those given off by ordinary tung oil varnishes during the drying period. The peculiar fatty odor which is characteristic of tung oil seems to be almost entirely eliminated by my process.

(3) They produce an exceptionally high gloss which seems to be superior to that produced by varnishes made by any other method.

(4) My new varnishes are "non-skinning" in character; that is to say, when allowed, for long periods of time, to remain in containers only partly filled they do not show thick surface skins which are almost invariably shown by practically all other types of synthetic resinous varnishes.

(5) The new varnishes have extraordinary wetting properties; when used as a grinding medium for pigments, they disperse these pigments to a finer degree and with less power consumption than obtains with practically any other type of varnish heretofore produced.

(6) The hardness, water resistance and other physical properties of varnishes produced by this process are not only equal to but very often are superior to those of varnishes produced by any other process.

(7) The varnishes have desirable "quick-drying" properties, generally drying in from 1 to 4 hours, according to the resin content.

(8) The varnishes have extremely desirable color retention properties and do not yellow as do most varnishes. It is for this reason that white enamels made with this new type of varnish remain white and do not show the yellowing characteristics of enamels made with ordinary varnish.

(9) Varnishes produced by my process have considerably longer durability than varnishes produced by the ordinary process. This is apparently brought about by the modifying influence of the traces of sulphur upon the tung oil used in the varnish. The durability may be from 20% to 50% greater than ordinary varnish produced without the treatment of the present invention.

As indicated above, the extremely easy grinding properties of varnishes produced by the process of the present invention make it feasible to produce pigmented varnishes, which are usually known as varnish enamels. These pigmented varnishes are produced with a finer dispersion of pigment and with greater ease of grinding than has heretofore been known. Moreover, the non-settling characteristics afforded the pigments by being thoroughly dispersed by the peculiar wetting action of these varnishes are quite outstanding. The following example is illustrative:

*Example VI*

35 pounds of any suitable white or colored pigment, such for instance as zinc oxide, titanium pigment, iron oxide or chrome green, are ground in 65 pounds of a varnish produced by one of the processes outlined above, yielding an enamel which has very marked non-settling properties, excellent flow, and a desirable gloss. Enamels so produced are non-skinning, show good color retention and have greater durability than do varnish enamels produced without employing the novel treatment of the invention.

By the expression "depolymerizing substance of the sulphur type" as used in the appended claims I mean to include elemental sulphur and also such organic compounds of sulphur as are capable of yielding sulphur when heated, in the presence of oils and synthetic resins, at an elevated temperature up to about 600° F.

I claim:

1. A composition of matter comprising a heat-convertible synthetic resin which when cooked with varnish oil at temperatures above about 450° F. normally forms insoluble complexes, and a depolymerizing substance of the group consisting of sulphur and sulphur-containing organic compounds capable of darkening white lead when heated with the latter, said substance being present in an amount just sufficient to prevent the resin from being heat converted to a relatively insoluble mass when heated with a varnish oil at a temperature above 450° F.

2. A composition of matter as defined in claim 1, characterized in that the depolymerizing substance is the reaction product of sulphur and chlorinated diphenyl.

3. A gas-proof, non-skinning, liquid coating composition which yields a film which does not develop frostiness, checking or wrinkles, comprising a varnish oil, a heat-convertible synthetic resin, which when cooked with varnish oil at temperatures above about 450° F. normally forms insoluble complexes, and a depolymerizing substance of the group consisting of sulphur and sulphur-containing organic compounds capable of darkening white lead when heated with the latter, said depolymerizing substance being present in an amount just sufficient to prevent the resin from being heat-converted to a relatively insoluble mass when heated with the oil at a temperature above about 450° F.

4. A gas-proof, non-skinning, liquid coating composition which yields a film which does not develop frostiness, checking or wrinkles, comprising a varnish oil including tung oil, a phenolaldehyde resin which, when cooked with varnish oil at temperatures above about 450° F., normally forms insoluble complexes, and a sulphur-containing organic compound capable of darkening white lead when heated with the latter, said sulphur-containing organic compound being present in an amount equivalent to from about 0.05% to about 0.09% by weight of said resin.

5. Process which comprises reacting a heat-convertible synthetic resin, which when cooked with a varnish oil at temperatures above about 450° F. normally forms insoluble complexes, with a depolymerizing substance of the group consisting of sulphur and sulphur-containing organic compounds capable of darkening white lead when heated with the latter, said substance being used in an amount just sufficient to prevent the resin from being heat-converted to a relatively insoluble mass when heated with a varnish oil at a temperature above about 450° F.

6. In the process of making a varnish base from a varnish oil and a heat-convertible synthetic resin which when cooked with a varnish oil at temperatures above about 450° F. normally forms insoluble complexes, the improvement which comprises heating together the resin and the oil in the presence of a depolymerizing substance of the group consisting of sulphur and sulphur-containing organic compounds capable of darkening white lead when heated with the latter, said depolymerizing substance being present in an amount sufficient to prevent the resin from being heat converted to a relatively insoluble mass when heated with the varnish oil at a temperature above about 450° F.

HENRY A. GARDNER.